UNITED STATES PATENT OFFICE.

CARL CHRISTIAN LEOPOLD GETHER BUDDE, OF COPENHAGEN, DENMARK, ASSIGNOR TO SÖREN LEMVIG FOG AND AAGE GEORG KIRSCHNER, OF SAME PLACE.

PROCESS OF PRODUCING MATCHES.

SPECIFICATION forming part of Letters Patent No. 676,873, dated June 25, 1901.

Application filed January 19, 1900. Serial No. 1,963. (No specimens.)

*To all whom it may concern:*

Be it known that I, CARL CHRISTIAN LEOPOLD GETHER BUDDE, a subject of the King of Denmark, residing at Copenhagen, in the Kingdom of Denmark, have invented certain new and useful Improvements in Processes of Producing Matches Ignitible on All Surfaces without Using Phosphorus, (for which I have applied for patents in Germany, dated December 11, 1899; in Denmark, dated December 18, 1899, and in France, dated December 27, 1899,) of which the following is a specification.

Repeated attempts have been made to render the use of phosphorus unnecessary in the manufacture of matches. Most of the matches that are said to be made without phosphorus do, indeed, contain the so-called "red" or "amorphous" phosphorus, or a prepared surface containing this red phosphorus is required for igniting them.

The object of the present invention is a process of making matches without phosphorus, said matches being ignitible on all surfaces.

By this invention a long-desired end is obtained—that is, the necessity of using phosphorus is entirely removed from the match-making industry. This desired end is obtained when a portion of the chlorate of the usual igniting composition, containing chlorate of potassium or other chlorate of the alkali group and bichromate of potassium or other bichromate of a monovalent metal— such as bichromate of sodium, bichromate of ammonia, or the like—is replaced by the chlorate of a divalent or polyvalent metal—as, for example, chlorate of barium, chlorate of calcium, chlorate of strontium, or chlorate of lead.

In carrying out this invention two different courses may be taken:

First, a so-called "headless" match is made by dipping the wooden or other splint, previously impregnated with water, into a hot concentrated solution of the chlorate of a divalent or polyvalent metal. The object of impregnating the splints with water is to prevent the chlorate from rising higher in the same than the point to which they are dipped. The splints thus impregnated with the chlorate could be ignited by rubbing them on a prepared surface containing red phosphorus. The impregnated end of the splint is now covered by a thin skin or coating of some igniting composition, which, besides the other constituent parts used for such purposes, must contain bichromate of potassium or other bichromate of the alkali group. When dry, a match is obtained that can be ignited on all surfaces—for example, on cloth, the wall, wood, or the like. The purpose of the present invention is not obtained by using the chlorate of a metal of the alkali group instead of the chlorate of a divalent or polyvalent metal for impregnating the splints. It is, for example, of no use to impregnate the splints with potassium chlorate and to then apply the composition containing the bichromate to the impregnated end. This fact can be easily explained by the fact that in the chlorates of the metals of the alkali group (in which group the metals are without exception monovalent) the chloric acid is held much stronger than in the chlorates of the divalent or polyvalent metals—as, for example, the alkaline-earth group. With a chlorate of the alkaline-earth group or of some suitable metal—for example, chlorate of lead—the chloric acid is therefore much more easily separated than with a chlorate of the alkali group. It has been found that of all salts the combination of chlorate of barium with bichromate of potassium is the best. The splints after being saturated with water are impregnated with chlorate of barium, and an igniting composition containing bichromate of potassium is then applied to the impregnated end. The following combination has proved to form a very suitable composition, viz: 24.5 parts chlorate of potassium, 9.6 parts sulfur, ten parts oxid of copper, five parts bichromate of potassium, and five parts glue or other adhesive. The various constituent parts can of course be varied. For example, chlorate of potassium can be wholly or partly replaced by chlorate of sodium, or instead of sulfur a sulfid of antimony may be used, and so on. When chlorate of sodium is used, a suitable agent—such as paraffin, resin, or such like—must be added in order to overcome its hygroscopic property.

By proceeding in the manner above described a match is obtained without a projecting ignition-head, as the igniting composition applied to the splint after it is impregnated with the chlorate need only be very thin.

Second. It is also possible to proceed by mixing—for example, in a paste—without dissolving the chlorate of the divalent or polyvalent metal with the igniting composition containing the bichromate of a monovalent metal and to dip the paraffined splints into this mass, which should further contain some adhesive.

This invention consists therefore, essentially, in the combination of a chlorate of a divalent or polyvalent metal with one or more bichromates of the alkali group. When these requirements are not complied with, the purpose of the invention cannot be realized.

What I claim, and desire to secure by Letters Patent of the United States, is—

1. An improved process of manufacturing matches consisting in internally impregnating the match-splint with a chlorate of a metal of plural valence and externally coating the end of the match-splint with a bichromate of a monovalent metal, substantially as set forth.

2. An improved process of manufacturing matches consisting in first saturating the splint with water, then impregnating its end with a halogen oxy salt of a divalent metal and subsequently applying a bichromate of a monovalent metal, substantially as set forth.

3. An improved process of manufacturing matches consisting in mixing without combining chlorate of barium and bichromate of potash, and applying them to a solid body, to wit, a match-splint of combustible material, substantially as set forth.

4. An improved process of manufacturing matches consisting in combining together in close association, but not in chemical combination, the combustible material of the end of the match-splints and chlorate of barium, chlorate of potassium, bichromate of potassium, sulfur, and oxid of copper, substantially as set forth.

5. An improved process of manufacturing matches consisting in impregnating a portion of the match-splints with a halogen oxy salt of a divalent metal and subsequently coating with an igniting material, substantially as set forth.

6. An improved process of manufacturing matches consisting in impregnating a portion of the match-splints with chlorate of barium and subsequently coating them with igniting material, substantially for the purposes described.

7. An improved process of manufacturing matches consisting in impregnating a portion of the match-splints with chlorate of barium and thereafter coating them with material containing bichromate of potassium, sulfur, oxid of copper and an adhesive substance, substantially for the purposes described.

In testimony whereof I have hereunto set my hand in the presence of two witnesses.

CARL CHRISTIAN LEOPOLD GETHER BUDDE.

Witnesses:
C. V. SCHON,
JULES BLOM.